Feb. 13, 1951 A. C. HENSLEY 2,541,965
TRUCK LOADER
Filed Sept. 14, 1946 3 Sheets-Sheet 3
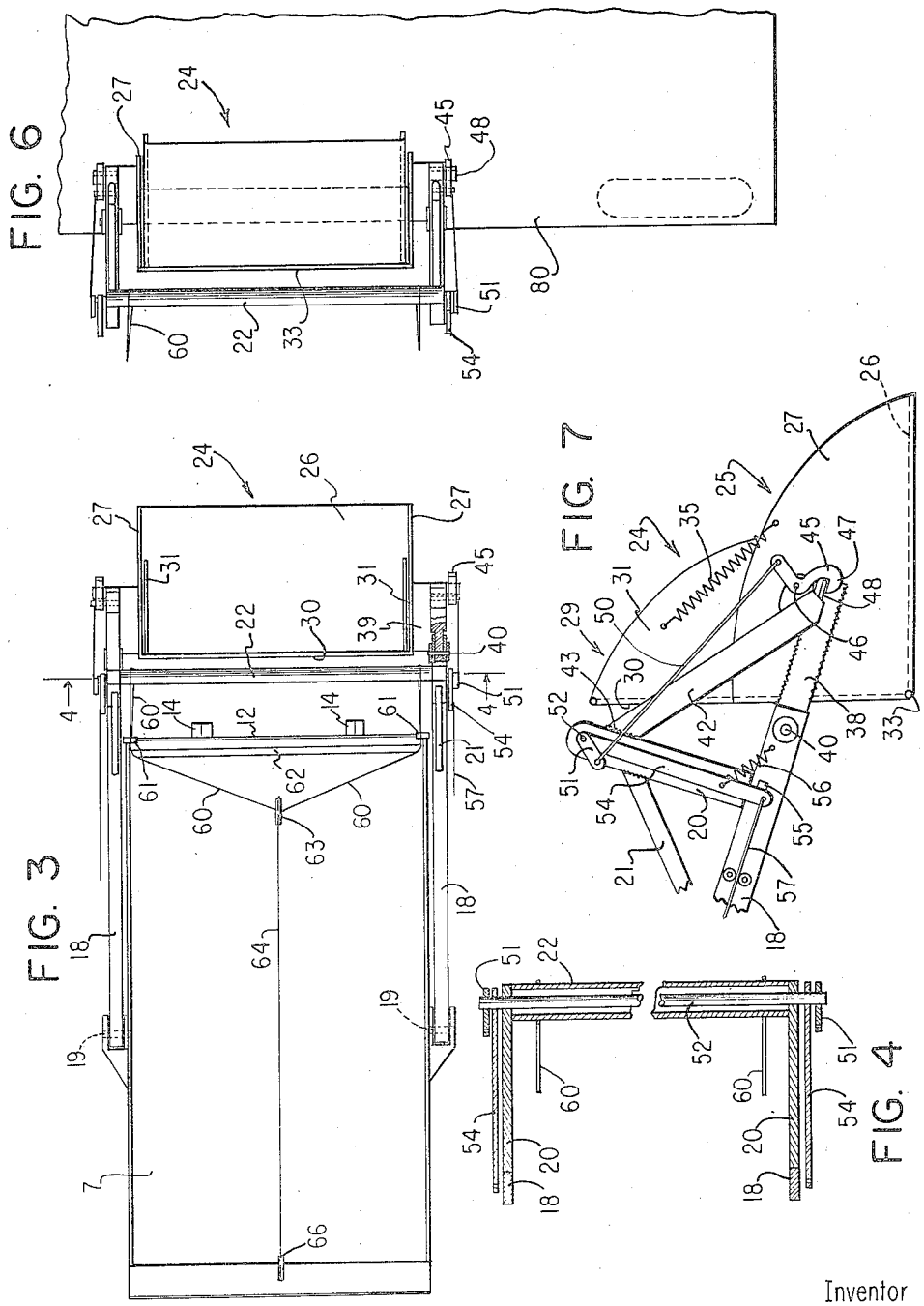
Inventor
Alva C. Hensley
By Morris Spector,
Attorney Patented Feb. 13, 1951

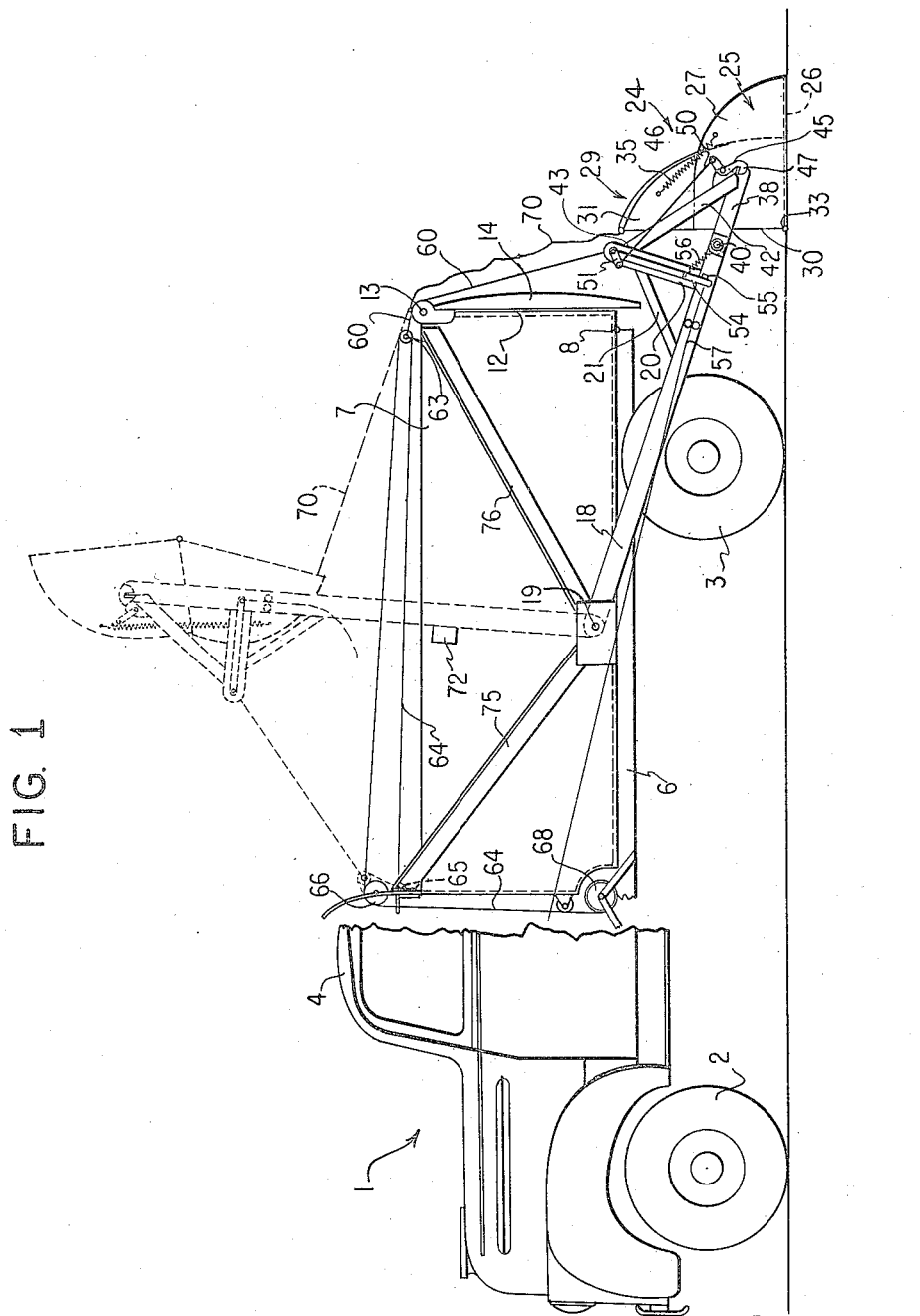

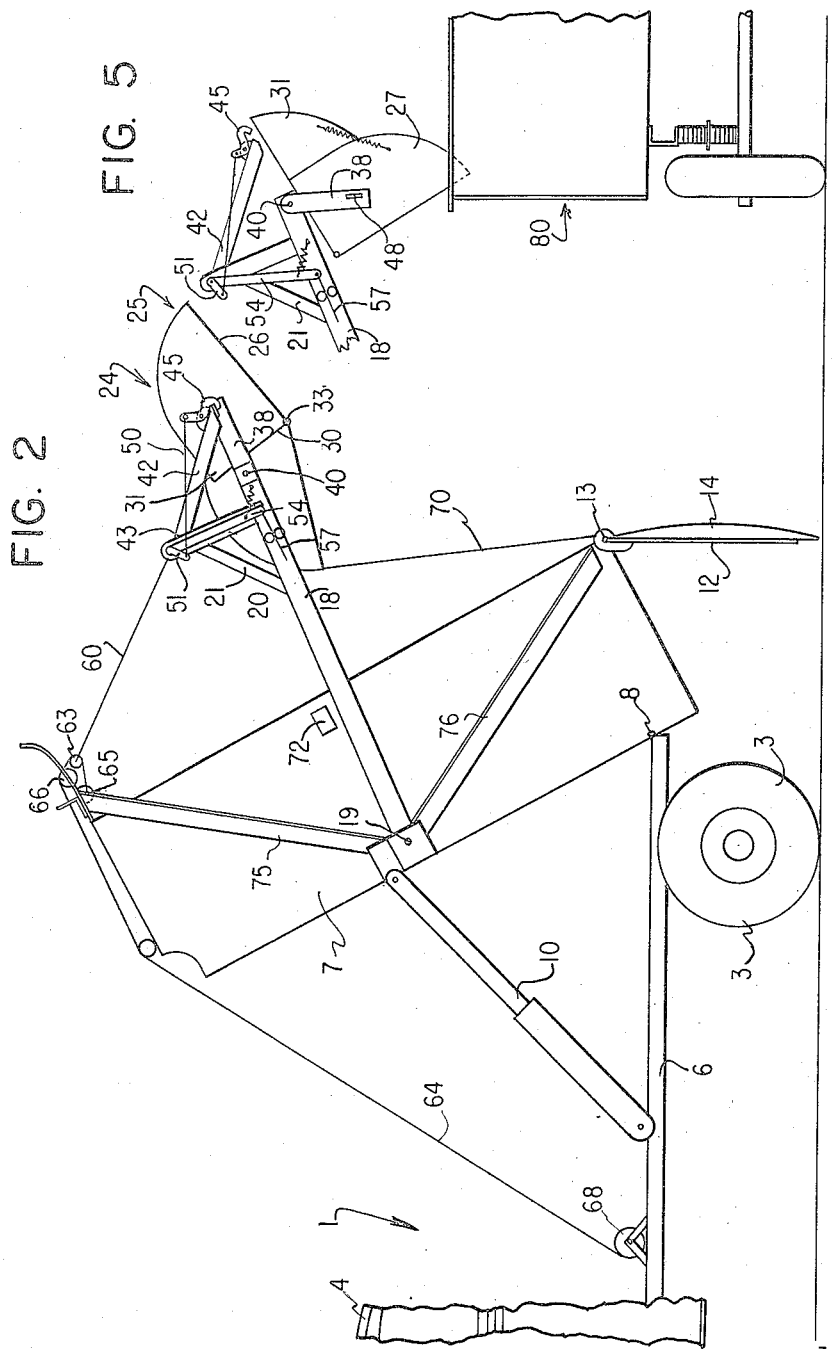

2,541,965

UNITED STATES PATENT OFFICE 2,541,965

TRUCK LOADER

Alva C. Hensley, Maroa, Ill., assignor to James D. Whitson, Decatur, Ill., as trustee Application September 14, 1946, Serial No. 697,052

12 Claims. (Cl. 214—78)

1

This invention relates to self-loading trucks and more particularly to the loading means for the truck.

The present invention is particularly adapted for attachment to most common types of dumping trucks. It is one of the objects of the present invention to provide a truck with a bucket which is so arranged that it can be filled by merely backing the truck into the material to be loaded and which bucket can then be operated to fill the truck on which it is mounted. It is a further object of the present invention to provide a bucket of the above mentioned character which is so constructed that it can be used to pick up a load and then dump the load in a truck other than the one on which the bucket is mounted.

It is a still further object of the present invention to provide a truck loader which can be mounted on a conventional type of dumping truck to be used for loading the truck on which it is mounted and which bucket will automatically be moved out of the way when the dumping body of the truck is manipulated to dump the load. A still further object of the present invention lies in the provision of a simple two piece bucket which is so arranged as to be self dumping when the bucket is brought to a predetermined position.

A still further object of the present invention is the provision of a two piece bucket of the above mentioned character wherein the two parts move to their unloading position as the bucket reaches a predetermined elevated position and wherein at least one of the two parts of the bucket cooperates with the truck body for moving the two parts of the bucket back to their relative closed positions as the bucket is returned from its dumping position towards its loading position.

The attainment of the above and further objects of the present invention will be apparent from the following specification taken in conjunction with the accompanying drawing forming a part thereof.

In the drawing:

Figure 1 is a side view of a self-loading dumping truck embodying the present invention;

Figure 2 is a view of the same truck in its load-dumping position;

Figure 3 is a plan view of the truck;

Figure 4 is a sectional view taken along the line 4—4 of Figure 2;

Figure 5 is a fragmentary side view illustrating an alternate use of the loading structure of the present invention;

Figure 6 is a plan view of the loading operation of Figure 5; and

2

Figure 7 is an enlarged side view of the bucket and its mounting means.

Reference may now be had more particularly to the drawing wherein like reference numerals designate like parts throughout.

In the drawings I have shown at 1 an automobile dumping truck of a conventional construction and to which my present invention has been applied. The truck includes the usual steering wheels 2, the rear driving wheels 3, the driver's cab 4, the body sills 6 and a dumping truck body 7 pivoted to the sills 6 to swing about a pivot 8 and adapted to be swung to a dumping position, such as indicated in Figure 2, by the usual power means, such as, for instance, a pneumatic ram 10 which may be operated from the cab of the truck. The truck body 7 includes also a usual type of tail gate 12 pivoted to the truck body at 13. In this instance the tail gate has two or more vertically extending guide bars 14 secured thereto and extending below the bottom of the tail gate for a reason which will be pointed out as this description proceeds.

A pair of side arms 18—18 are pivoted to the truck body 7 on opposite sides thereof to swing about horizontally aligned pins forming a horizontal transverse pivot axis 19 which is located a substantial distance forward of the rear end of the truck body. In this instance it is located at the forward half of the truck body 7. Each side arm 18 extends rearwardly of the truck body and adjacent the rear end thereof has an upright 20 welded or otherwise rigidly secured thereto and braced by a brace 21 which is welded at one end to a side arm 18 and at its opposite end to an upright 20. The two uprights 20—20 are rigidly connected together by a steel tube or pipe 22 welded to the uprights 20. The pipe and the uprights 20 thus interconnect the arms 18—18 adjacent their outer ends and hold them against spreading apart.

A two piece bucket, indicated at 24, is pivotally mounted on the free ends of the arms 18—18. The bucket 24 consists of a lower or shovel portion 25 which includes a flat base 26 having a pair of sides 27—27 welded or otherwise secured thereto, but having no back. The second piece of the two piece bucket is a back stop 29 consisting of a rear plate 30 and a pair of side plates 31 welded thereto. The back stop has no bottom between the side plates 31—31. The side plates 31 of the back stop fit snugly between the sides 27—27 of the shovel portion 25 of the bucket. The back stop 29 is pivoted to the bottom 25 at a pivot 33. The side arms 31 of the back stop fit between the side arms 27 of the lower bucket portion 25. A pair of springs 35, one on each side of the bucket, connects the sides 31 with the sides 27 and constantly urges the back stop to its back closing position, as indicated in Figures 1 and 7, where the bottom of the sides 31 bear against the base 26 of the bucket. A pair of short steel mounting straps 38 are secured one to each of the bucket sides 27, on the outer sides of the bucket, as by spacer blocks 39 to which they are welded and which are in turn welded to the outer sides of the sides 27. The straps extend rearwardly of the bucket and are pivoted at 40 one to each of the arms 18. The bucket is thus pivotally supported by the arms 18.

Each one of the uprights 20 has a projecting bar 42 welded thereto as at 43 and extending downwardly and rearwardly from the weld. Each bar 42 carries a bell crank latch 45 pivoted thereto as at 46 and having at one end a latching nose 47 which is adapted to ride under and engage a latching lug 48 that projects from and is welded to the strap 38. When the latch 45 engages the lug 48 the bucket is locked to the arms 18 and cannot swing about the pivot axis 40. When the latch 45 is disengaged the bucket is free to swing about the pivot 40. In order to release the latch 45 there is provided a rod 50 which is connected at one end to the bell crank latch 45 and at its opposite end is connected to a crank 51 that is keyed to a rod 52 that extends through the pipe 22. The rod 52 is turned by means of a lever 54 that is keyed thereto and is urged in one direction against a stop 55 by a spring 56 and is movable in the opposite direction by a trip cable 57 that leads to the interior of the truck cab 4. By pulling on the trip cable the lever 54 is turned in a direction clockwise as seen in Figure 1, thereby turning the rod 52 in the same direction and thus turning the two cranks 51 which are keyed to the rod 52 on opposite sides of the truck body. Each one of the cranks 51 pulls upon a rod or cable 50 to release its latch 45. Once the latch is released the bucket is free to turn about the pivot 40 and will so turn by gravity whenever the arms 18 are in an elevated position.

Means is provided for raising the arms 18 to raise the bucket. This means comprises a cable 60 which is secured to the steel tube or pipe 22 and extends over sheaves or spools 61 at the top of the tail gate to a cable spreader bar 62 and to a pulley 63. A cord 64 has one end thereof rigidly secured at 65 to the forward top end of the truck body 7, then extends rearwardly above the truck body and around the pulley 63, then again forwardly of the truck body and around a pulley 66 at the forward top center of the truck body, and then down to a wind-up drum 68 of a power unit. When the drum 68 of the power unit is wound to reel in the cable 64 the pulley 63 is moved to the left, as seen in Figure 1, thus drawing the cable 60 upwardly and raising the arms 18 which carry the bucket 24. The pipe 22 just clears the top of the tail gate as the arms 18 are raised, and ultimately reaches the truck loading position illuustrated in dotted lines in Figure 1. There may be provided a cable 70 one end of which is secured to the top rear side of the back 30 of the bucket. The other end of the cable 70 is permanently fixed to the top of the tail gate. When the bucket is in its lowered position, as illustrated in Figure 1, the cable 70 is loose. When the bucket is raised, and the side arms 18 approach the position illustrated in dotted lines in Figure 1, the cable 70 is drawn taut and as the arms 18 continue to swing towards the position illustrated in dotted lines in Figure 1, the taut cable 70 then positively forces the back portion of the bucket to swing downwardly about the hinge pivot 33, in a counterclockwise direction, to its dumping position and thus assures dumping of the contents of the bucket. The cable 70 need not be provided in those cases where the bucket is used with dry loading material of the type which is not likely to cause the two bucket parts to stick together.

In order to load the bucket for loading the truck the automobile truck with the bucket in the position illustrated in Figure 1 is backed into the load. When the bucket has been sufficiently filled the special power unit is operated to wind the cable 64 on the drum 68, thus drawing the arms 18—18 upwardly to raise the bucket. At this time the latch 45 is locked under the latching lug 48 so that the bucket cannot swing about the pivot 40. As the arms 18 rise and bring the bucket to an eleated position the bucket is gradually being tilted with respect to the ground but not with respect to the arms 18. Thus as the bucket comes over the top of the truck there is a tendency for the back of the bucket gradually to swing backward and gradually to spill its load into the truck body as the arms 18 continue to turn. If that tendency is insufficient to cause the bucket back to swing about the pivot 33 against the action of the springs 35, that swinging action is forced by the cable 70 when the cable 70 is drawn taut as the arms continue to move. When the arms 18 ultimately reach their limiting position, as determined by limiting stops 72 which are welded to the outsides of the truck body, the bucket back 29 has been positively forced to its dumping position. When the arms 18—18 are then swung back from their elevated position to their lowered position the springs 35 force the back 29 of the bucket to return to the position illustrated in full lines in Figure 1. In the event that the friction between the bucket back and the sides of the bucket bottom is too great to allow the springs 35 to return the back stop 29, as may result when clay becomes clogged in the bucket, no harm will result. Under such circumstances the return or lowering movement of the arms 18 will bring the outer side of the back 30 into engagement with the top of the tail gate and, as the arms 18 continue to move downwardly, the back 29 will be positively forced to turn about the pivot 33 towards the position illustrated in full lines in Figure 1. If the back 29 does not ultimately reach the full line position illustrated in Figure 1, as, for instance, due to the action of clay between the side plates 31 and the side plates 27, the top portion of the back 30 will ride down the guide bars 29 as the arms 18 are lowered, and the back 30 will ultimately end up in a position in engagement with the bottom portions of the guide bars 14.

From the above description it is apparent that the springs 35 may be entirely omitted. When that is the case the back stop 29 will be tilted back from the position illustrated in full lines, about the center 33 as a center, until the top of the rear plate 30 engages the guide bars 14. This will not interfere with the action of the bucket. It will merely increase the loading capacity of the bucket. Under such circumstances when the arms 18 are elevated the top of the rear plate 30 rides upwardly on the guide bars 14 until it rides above the tail gate and then, when the pivot 33 rises to a level above the tail gate and continues to rise, the back stop 29 tilts about the pivot axis 30 and gradually dumps the contents of the bucket into the truck body.

The truck of the present invention may be used for self loading, in a manner above described, or may be used for loading another truck. When the bucket 24 has been filled the arms 18 may be elevated to a position such that the pivot 40 is only slightly above the top of the truck body. When that is the case the bucket projects a considerable distance rearwardly of the body of the truck. Another dumping truck 80, which does not have self loading equipment, may then be backed into a position at right angles to the truck 1 and immediately in back of the same and with the body of the other truck immediately below the bucket. The bucket may then be discharged by pulling on the trip cable 57 which turns the lever 54 in a direction clockwise as seen in Figure 4, thereby turning the crank 51 in a corresponding direction and thus pulling on the rod 50 to swing the ball crank latch 45 to a position out of engagement with the latching lug 48 so that the entire bucket is free to swing about a pivot 40 under the action of gravity, resulting in dumping of its load into the truck body 80 thereunder. Thereafter the truck 1 may be moved out of the way and then, by lowering the arms 18, the bottom of the bucket is first brought into engagement with the ground and upon further lowering of the arms 18 the bucket is swung about the pivot 40 until the curved lower portion of the latch 45 rides over the latching lug 48 and ultimately the latch 45 engages under the lug 48, thus again locking the bucket to the latch 48 at the end of the projecting bar 42, which is rigid with respect to the arms 18.

Angle iron bars 75—76 are provided on each side of the truck body 7 for relieving it of the strain that it would otherwise be subjected to when the cable 64 is being reeled in to hoist a loaded bucket.

When the truck 1 is traveling, the side arms 18 are in a position elevating the bucket from the ground. Thereafter, when the load in the truck body is to be dumped it is not necessary to go through a separate bucket raising operation regardless of how low the bucket may be. This is due to the fact that the bucket necessarily swings upwardly as the truck body is tilted to its dumping position even if the cord 64 is not being wound up on the take-up drum 68. The bucket can be in a position appreciably lower than that illustrated in Figure 2 and still not interfere with the dumping of the truck.

From the above description it is obvious that the truck of the present invention may be used for self-loading or for loading another truck. It is also apparent that if the loading means of the present invention are to be used only for self loading then the pivot 40 may be omitted and the sides 27 of the bucket may be welded directly to the arms 18 as by making the steel straps 38 an integral part of the arms 18.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A loading device for vehicles comprising a bucket, swinging arms pivoted to the vehicle and on which arms the bucket is mounted, said bucket including a shovel portion and a load back stop portion pivoted with respect to one another, means for preventing separation of the two portions during the bucket loading operation, and means effective responsive to a predetermined elevation of the bucket for causing separation of the two bucket parts to dump the contents thereof, said two means comprising spring members urging the two bucket parts together and a cord for separating them, said cord being secured to the bucket and to the vehicle at a point spaced from pivot center of said arms and drawn taut by the swinging of said arms.

2. In combination with a motor truck including a dumping body pivoted for dumping movement about an axis extending transversely of the body, a pair of side arms on opposite sides of the truck and pivoted to the body about an axis extending transversely thereof and located forward of the rear end of the dumping body by an amount in excess of the depth of the dumping body, a load-gathering bucket at the end of the arms, said bucket including a shovel portion and a back pivoted thereto, and means at the rear of the truck constituting a stop limiting the rearward movement of said back when the bucket is in its lowered position, said means extending upwardly along the back of the truck to the top thereof for limiting the rearward pivoting of the back while the top of the bucket is below the top of the truck.

3. In combination with a motor truck having a load-receiving body, a pair of side arms on opposite sides of the truck and pivoted to the body about an axis extending transversely thereof and located forward of the rear end of the dumping body, by an amount in excess of the depth of the dumping body, a load-gathering bucket at the end of the arms, said bucket including a shovel portion and a back pivoted thereto, and means at the rear of the truck constituting a stop limiting the rearward movement of said back when the bucket is in its lowered position.

4. In combination with a motor truck having a load-receiving body, a pair of side arms on opposite sides of the truck and pivoted to the body about an axis extending transversely thereof and located forward of the rear end of the dumping body, by an amount in excess of the depth of the dumping body, a load-gathering bucket at the end of the arms, said bucket including a shovel portion and a back pivoted thereto, and means at the rear of the truck constituting a stop limiting the rearward movement of said back when the bucket is in its lowered position, said means extending upwardly along the back of the truck to the top thereof for limiting the rearward pivoting of the back while the top of the bucket is below the top of the truck.

5. In combination with a motor truck having a load-receiving body, a pair of side arms on opposite sides of the truck and pivoted to the body about an axis extending transversely thereof, a load-gathering bucket at the end of the arms, said bucket including a shovel portion and a back pivoted thereto, and means at the rear of the truck constituting a stop limiting the rearward movement of said back when the bucket is in its lowered position, said means extending upwardly along the back of the truck to the top thereof for limiting the rearward pivoting of the back while the top of the bucket is below the top of the truck.

6. In combination with a motor truck including a load-receiving body, a pair of side arms on opposite sides of the truck and pivoted to the body about an axis extending transversely thereof and located forward of the rear end of the body, a load-gathering bucket at the end of the arms pivoted to the arms about a pivot axis rearward of the bucket, said bucket including a shovel portion and a back pivoted thereto, means for locking the bucket against swinging with respect to the arms, means for swinging the back with respect to the shovel portion to permit unloading of the bucket at the rear thereof, and means for unlocking said bucket-locking means to permit swinging of the bucket about the arms for unloading the bucket from the opposite end thereof.

7. In combination with a motor truck including a dumping body pivoted for dumping movement about an axis extending transversely of the body at the rear of the truck, a pair of side arms on opposite sides of the truck and pivoted to the body about an axis extending transversely thereof and located forward of the rear end of the dumping body to rise with the body as the body is tilted, a load-gathering bucket at the end of the arms, and means for raising the arms to raise the bucket to its unloading position, said means including a pulley and cable system including at least one pulley that rises with the truck body as the body is pivoted to its dumping position and draws the cable of the cable system to raise the bucket above the rear of the truck as the body is raised to its dumping position, whereby the bucket is automatically raised out of the way as the body is raised to its dumping position.

8. In combination with a motor truck including a dumping body pivoted for dumping movement about an axis extending transversely of the body at the rear of the truck, a pair of side arms on opposite sides of the truck and pivoted to the body about an axis extending transversely thereof and located forward of the rear end of the dumping body to rise with the body as the body is tilted, a load-gathering bucket at the end of the arms, means for raising the arms to raise the bucket to its unloading position, said means including a pulley and cable system including at least one pulley that rises with the truck body as the body is pivoted to its dumping position and draws the cable of the cable system to raise the bucket above the rear of the truck as the body is raised to its dumping position, whereby the bucket is automatically raised out of the way as the body is raised to its dumping position, said bucket including a shovel portion and a back pivoted thereto, and means at the rear of the truck constituting a stop limiting the rearward movement of said back when the bucket is in its lowered position, said stop means extending upwardly along the back of the truck to the top thereof for limiting the rearward pivoting of the back while the top of the bucket is below the top of the truck.

9. In combination with a motor truck including a dumping body pivoted for dumping movement about an axis extending transversely of the body at the rear of the truck, a pair of side arms on opposite sides of the truck and pivoted to the body about an axis extending transversely thereof and located forward of the rear end of the dumping body to rise with the body as the body is tilted, a load-gathering bucket at the end of the arms, means for raising the arms to raise the bucket to its unloading position, said means including a pulley and cable system including at least one pulley that rises with the truck body as the body is pivoted to its dumping position and draws the cable of the cable system to raise the bucket above the rear of the truck as the body is raised to its dumping position, whereby the bucket is automatically raised out of the way as the body is raised to its dumping position, said bucket including a shovel portion and a back pivoted thereto, means at the rear of the truck constituting a stop limiting the rearward movement of said back when the bucket is in its lowered position, said stop means extending upwardly along the back of the truck to the top thereof for limiting the rearward pivoting of the back while the top of the bucket is below the top of the truck, means for locking the bucket against swinging with respect to the arms, means for swinging the back with respect to the shovel portion to permit unloading of the bucket at the rear thereof, and means for unlocking said bucket-locking means to permit swinging of the bucket about the arms for unloading the bucket from the opposite end thereof.

10. In combination with a motor truck including a load-receiving truck body having a tail gate, a loading bucket at the rear of the truck, means for swinging the bucket from a ground-engaging position to a position above and rearward of the tail gate, said bucket having an open backed shovel portion and a back pivoted thereto and movable from a loading to an unloading position, when the back is in its unloading position the locus of its movement as the bucket travels to the bucket-loading position intersecting the tail gate whereby the tail gate forces the back to its bucket-loading position if it is not already in said position.

11. In combination with a motor truck including a dumping body pivoted for dumping movement about an axis extending transversely of the body at the rear of the truck, a pair of side arms on opposite sides of the truck and pivoted to the body about an axis extending transversely thereof and located forward of the rear end of the dumping body to rise with the body as the body is tilted, a scoop type load-gathering bucket at the end of the arms, means for raising the arms to raise the bucket to its unloading position, said means including a pulley and cable system including at least one pulley that rises with the truck body as the body is pivoted to its dumping position and draws the cable of the cable system to raise the bucket above the rear of the truck as the body is raised to its dumping position, whereby the bucket is automatically raised out of the way as the body is raised to its dumping position.

12. In combination with a motor truck including a dumping body pivoted for dumping movement about an axis extending transversely of the body at the rear of the truck, a pair of side arms on opposite sides of the truck and pivoted to the body about an axis extending transversely thereof and located forward of the rear end of the dumping body to rise with the body as the body is tilted, a load-gathering bucket at the end of the arms, means for raising the arms to raise the bucket to its unloading position, said means including a pulley and cable system including at least one pulley that rises with the truck body as the body is pivoted to its dumping position and draws the cable of the cable system to raise the bucket above the rear of the truck as the body is raised to its dumping position, whereby the bucket is automatically raised out of the way as the body is raised to its dumping position, said bucket including a shovel portion and a back pivoted thereto, means for locking the bucket against swinging with respect to the arms, means for swinging the back with respect to the shovel portion to permit unloading of the bucket at the rear thereof, and means for unlocking said bucket-locking means to permit swinging of the bucket about the arms for unloading the bucket from the opposite end thereof.

ALVA C. HENSLEY.

REFERENCES CITED

The following references are of record in the file of this patent:

UNITED STATES PATENTS

| Number | Name | Date |
| --- | --- | --- |
| 1,473,109 | Libertini et al. | Nov. 6, 1923 |
| 1,703,600 | Sell | Feb. 26, 1929 |
| 1,905,855 | Gross | Apr. 25, 1933 |
| 1,922,851 | Howard | Aug. 15, 1933 |
| 2,004,022 | Twik | June 4, 1935 |
| 2,019,451 | Harm | Oct. 29, 1935 |
| 2,170,932 | Venema | Aug. 29, 1939 |
| 2,244,559 | Lawton | June 3, 1941 |
| 2,326,338 | Drott et al. | Aug. 10, 1943 |
| 2,387,687 | Smith | Oct. 23, 1945 |